EMERGENCY ALARM AND REPORTING SYSTEM

Filed Feb. 19, 1954 4 Sheets-Sheet 1

INVENTOR.
John P. Zimmerman.
BY
Fishburn & Mullendore
ATTORNEYS.

April 8, 1958 J. P. ZIMMERMAN 2,830,119

EMERGENCY ALARM AND REPORTING SYSTEM

Filed Feb. 19, 1954 4 Sheets-Sheet 2

INVENTOR.
John P. Zimmerman.

BY

Fishburn & Mullendore

ATTORNEYS.

April 8, 1958 J. P. ZIMMERMAN 2,830,119

EMERGENCY ALARM AND REPORTING SYSTEM

Filed Feb. 19, 1954 4 Sheets-Sheet 3

INVENTOR.
John P. Zimmerman
BY
Fishburn & Mullendore
ATTORNEYS.

INVENTOR.
John P. Zimmerman.
BY
Fishburn & Mullendore
ATTORNEYS.

2,830,119
Patented Apr. 8, 1958

2,830,119

EMERGENCY ALARM AND REPORTING SYSTEM

John P. Zimmerman, Kansas City, Mo.

Application February 19, 1954, Serial No. 411,350
5 Claims. (Cl. 179—5)

This invention relates to emergency alarm and reporting systems, and more particularly to a novel system wherein actuation of an emergency detector causes operation of mechanism to report the emergency to selected stations or authorities.

There have been various fire and burglar alarm systems utilizing leased telephone lines and the like for transmitting a signal to an office or station advising that the alarm circuit in the protected building had been energized. With such systems personnel maintained at the office or station investigate and also report the fire or burglary to the proper authorities. The use of leased telephone lines is expensive and also requires special lines for that purpose and the signal is usually by a light or buzzer which advises the personnel in the office or station the location of the emergency only by indicia which indicates the particular building to which the leased telephone line is connected. This necessitates a control board with lights and buzzers for each particular protected building.

The objects of the present invention are to provide an emergency alarm and reporting system utilizing the usual telephone service for reporting the emergency to a selected authority without interference with regular telephone use and service to and from the protected building; to provide an emergency alarm and reporting system associated with conventional telephone instruments wherein mechanism energized by a system actuates the telephone circuit and dials a preselected number and then through a mechanical recording reports the emergency and the location thereof of the authority at the telephone number dialed; to provide such an emergency alarm and reporting system with an audible signal such as a horn, siren or the like for giving the alarm at the location of the emergency; to provide a mechanism associated with a conventional telephone instrument for completing the telephone circuit as by lifting the receiver, mechanically dialing a preselected number on the telephone instrument, and transmitting an audible message to the station having the number dialed; and to provide such a mechanism with a repeat apparatus for repeating the dialing and transmitting of the message until the mechanism is deenergized so as to avoid failure of transmission of the message due to the line being busy at the number dialed; to provide an emergency alarm and reporting system utilizing conventional telephone equipment in a manner that avoids the necessity of having leased telephone lines and the like; and to provide an emergency alarm and reporting system that is simple in construction, easy to install and highly efficient in communicating the existence and location of an emergency such as a fire or burglary.

In accomplishing these and other objects of the present invention I have provided improved details of structure, the preferred forms of which are illustrated in the accompanying drawings, wherein.

Figure 1:
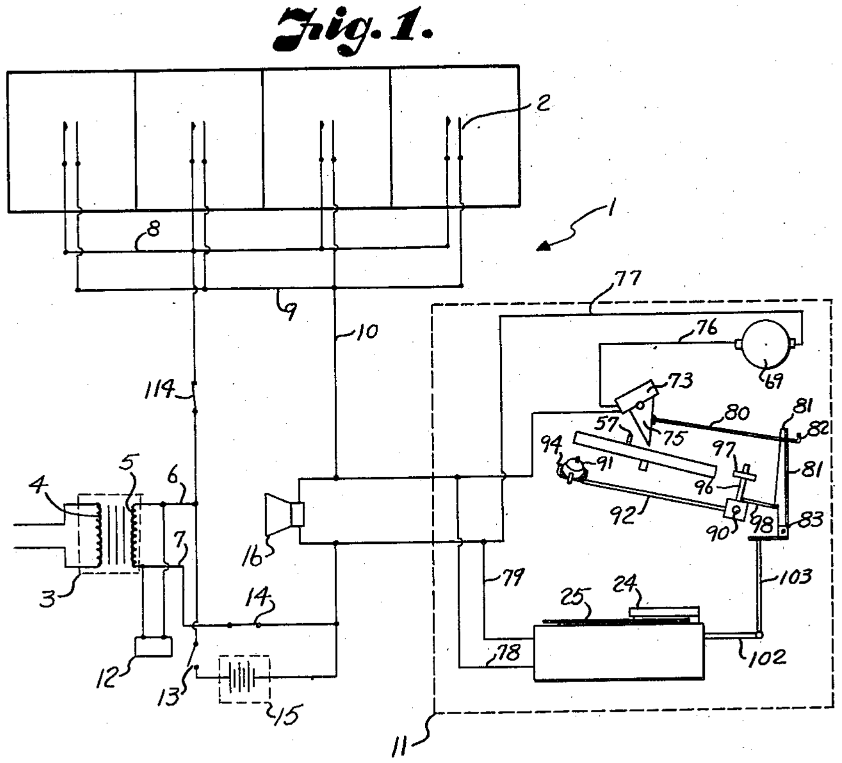
Fig. 1 is an electrical diagram of the emergency alarm and reporting system.

Referring more in detail to the drawings:

1 designates an emergency alarm and reporting system embodying the improvements of the present invention. One or more emergency detectors 2 are arranged in each area to be protected. The emergency detectors 2 are preferably suitable temperature-responsive switches or thermostats when the system is used for giving an alarm and reporting a fire, or switches which are actuated by relative movement of two members such as a window in a building or by suitable trip wires and the like when the system is used for giving the alarm and reporting robberies and the like. It is believed obvious that the system can be used for various types of emergencies but for simplification of description it will be described herein as a fire alarm and reporting system wherein the emergency detectors 2 are temperature-responsive switches which are preferably of a type that will respond to close an electrical circuit when the temperature of the surrounding air exceeds a predetermined minimum or the temperature of the air increases faster than a predetermined rate. It is preferable that all of the thermostats or temperature-responsive devices 2 in an entire section or building to be protected be connected in parallel circuit.

A suitable power supply is arranged to supply electrical current to the system and in the illustrated structure the power supply consists of a transformer 3 having a primary winding 4 suitably connected with a source of electrical current, such as a 110 volt circuit, and an output or secondary winding 5 connected to conductors 6 and 7. The conductor 6 is connected by branches 8 to one terminal of each of the thermostats 2. The other terminals of the thermostats are connected by branches 9 with a conductor 10 which leads to a telephone dialing and signal communication mechanism 11. The conductor 7 also leads to the mechanism 11. To provide for an auxiliary power supply a relay 12 is arranged in parallel circuit with the conductors 6 and 7 whereby failure of the 110 volt circuit causes the relay to close a switch 13 and open a switch 14 to connect a battery 15 to the conductors 6 and 7 and provide electrical energy to the system. A suitable siren, horn or other audible signal device 16 is preferably connected in parallel circuit with the emergency reporting mechanism 11 whereby the signal 16 gives an alarm at the premises where the emergency occurs.

The emergency reporting mechanism 11 preferably consists of a housing or cabinet 17 which also forms an accessible support for a conventional dial telephone instrument 18. In the illustrated structure the cabinet 17 consists of a lower portion 19 having a bottom 20, side walls 21 and a cover 22 defining a compartment 23 in which is located a conventional repeating type record player 24 including the usual amplifier circuit and speaker to audibly reproduce sounds, voice and the like recorded on a record 25. It is preferably that one wall of the lower portion 19 of the cabinet be removable for access to the record player. In the illustrated structure the cover 22 is secured to one of the side walls 21 by hinges 26 whereby the cover can be lifted for such access. In the illustrated structure the telephone instrument 18 is supported on the cover 22 and guide strips 27 are arranged on said cover for aiding in locating and holding the telephone instrument 18 in position. The dial portion 28 of the telephone instrument is toward the rear of the cabinet 17 and extends under an upward and forward extending portion 29 of the cabinet 17 whereby the lower wall 30 of the cabinet portion 29 is spaced from and substantially parallel to the dial 28 of the telephone instrument to provide room for a dialing crank 31 which engages in the dial 28 and is operated to dial same as later described.

The dialing crank 31 has a pin 32 depending from the end thereof and adapted to extend into the finger openings in the dial 28. The dialing crank 31 is fixed to a shaft 33 rotatably mounted in a bearing 34 carried on the lower wall 30, said shaft 33 extending into the interior of the upper cabinet portion 29 and having a gear pinion 35 in said cabinet and fixed on the upper portion of the shaft 33. The gear pinion 35 meshes with a gear 36 rotatably mounted on a shaft 37 which extends through aligned apertures 38 and 39 in the lower wall 30 and a plate 40 respectively. The plate 40 is a portion of a frame 41 in the cabinet portion 29 and is fixed on a block 42 that is secured to the forward plate 43 and lower wall 30 of the cabinet portion 29, the block 42 being of a thickness corresponding to the spacing between the lower wall 30 and the plate 40. The lower wall 30 preferably has collars 44 secured thereto and sleeved on the shaft 37 for increased bearing support for said shaft.

A dial number control disk 45, having a diameter corresponding to the outside diameter of the gear 36, is rotatably mounted on the shaft 37 above the gear 36, and fixed to the upper face of the disk 45 is a gear 46 which is substantially identical to the gear 36. The disk 45 and gear 46 are provided with axial bearing apertures 47 and 48 respectively that are sleeved on the shaft 37 to rotatably mount the disk and gear thereon. The disk 45 has a plurality of spaced notches 49 in its periphery, the spacing and number of the notches determining the numbers dialed on the telephone instrument. In order that the numbers may be changed as desired it is preferable that the disk 45 and gear 46 be removably connected as by screws 50. A cam segment 51 is suitably secured, as by screws 52, to the upper face of the gear 46, the cam segment having a periphery 53 extending beyond the outer portions of the teeth of the gear 46. The cam segment 51 is arranged on the gear 46 whereby it is over an unnotched portion of the disk 45 and said cam segment 51 has spaced notches 54 which are also for use in rotating the gear whereby said gear is rotated through 360° as later described. The cam segment has an upstanding cam flange 55 for operating the telephone receiver raising device 56 as later described. The cam segment also has an upstanding lug 57 at one end thereof for operating a switch in the electric circuit as later described.

Figure 3:
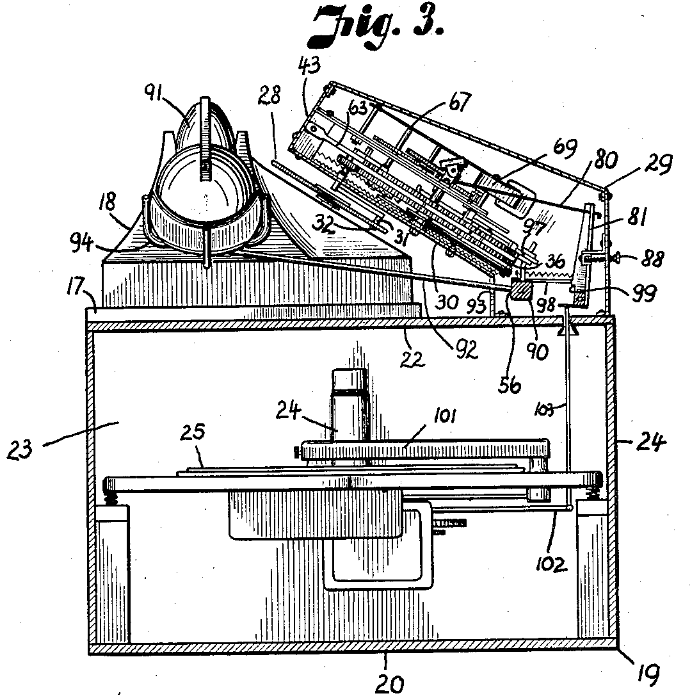
Fig. 3 is a vertical sectional view through the telephone actuating, dialing and message communicating mechanism.
Figure 4:
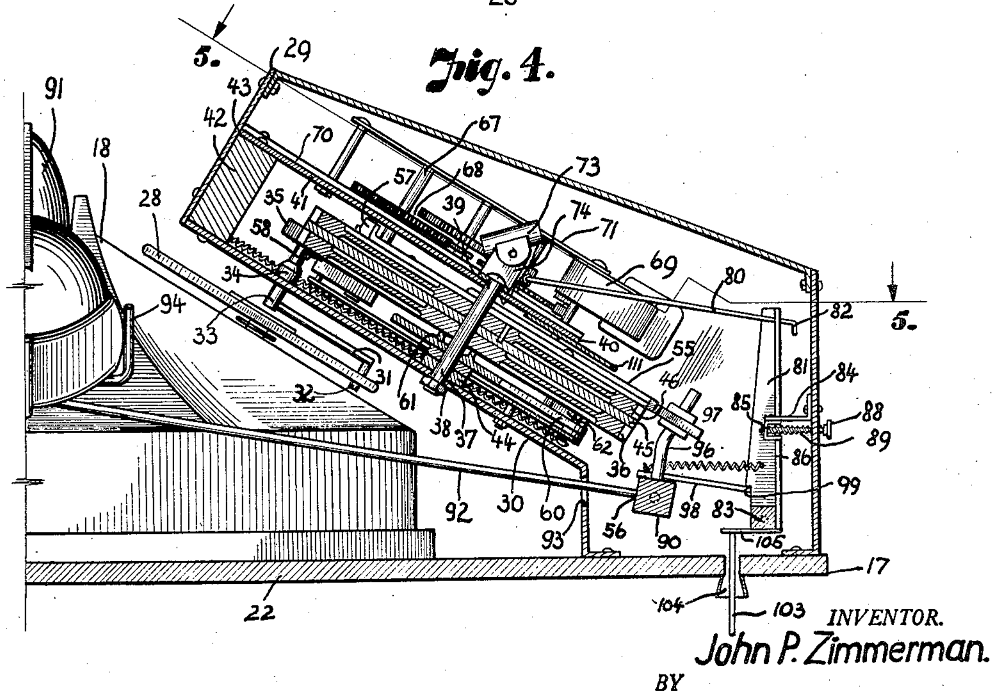
Fig. 4 is an enlarged vertical sectional view through the telephone actuating and dialing mechanism.
Figures 5, 6, 7:
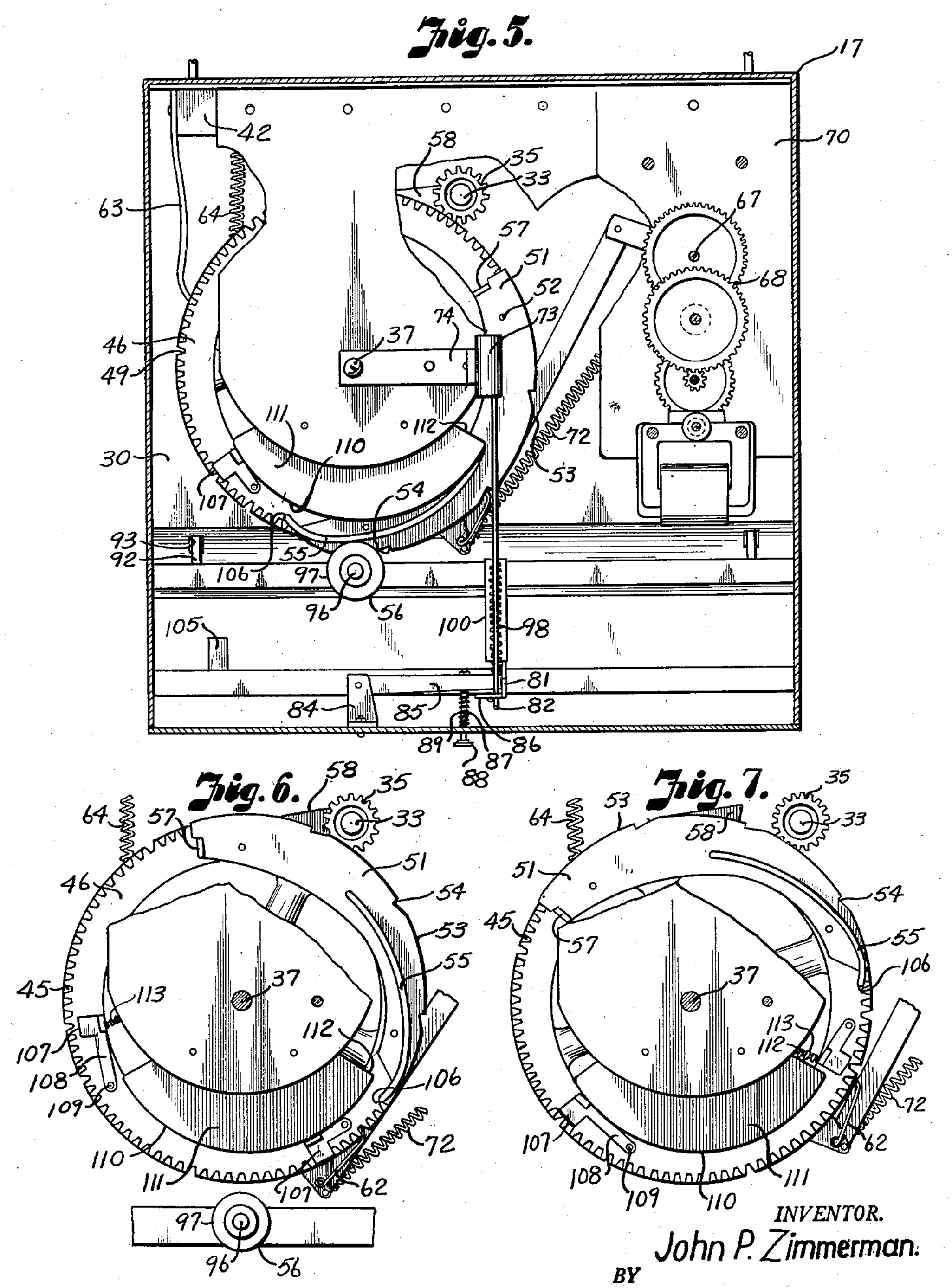
Fig. 5 is a sectional view through the dialing mechanism on the line 5—5, Fig. 4.
Fig. 6 is a sectional view illustrating the ratchet and cam members which cooperate in determining the telephone numbers dialed.
Fig. 7 is a sectional view similar to Fig. 6 with the ratchet and cam mechanism moved to the next digit dialed.
Figure 8:
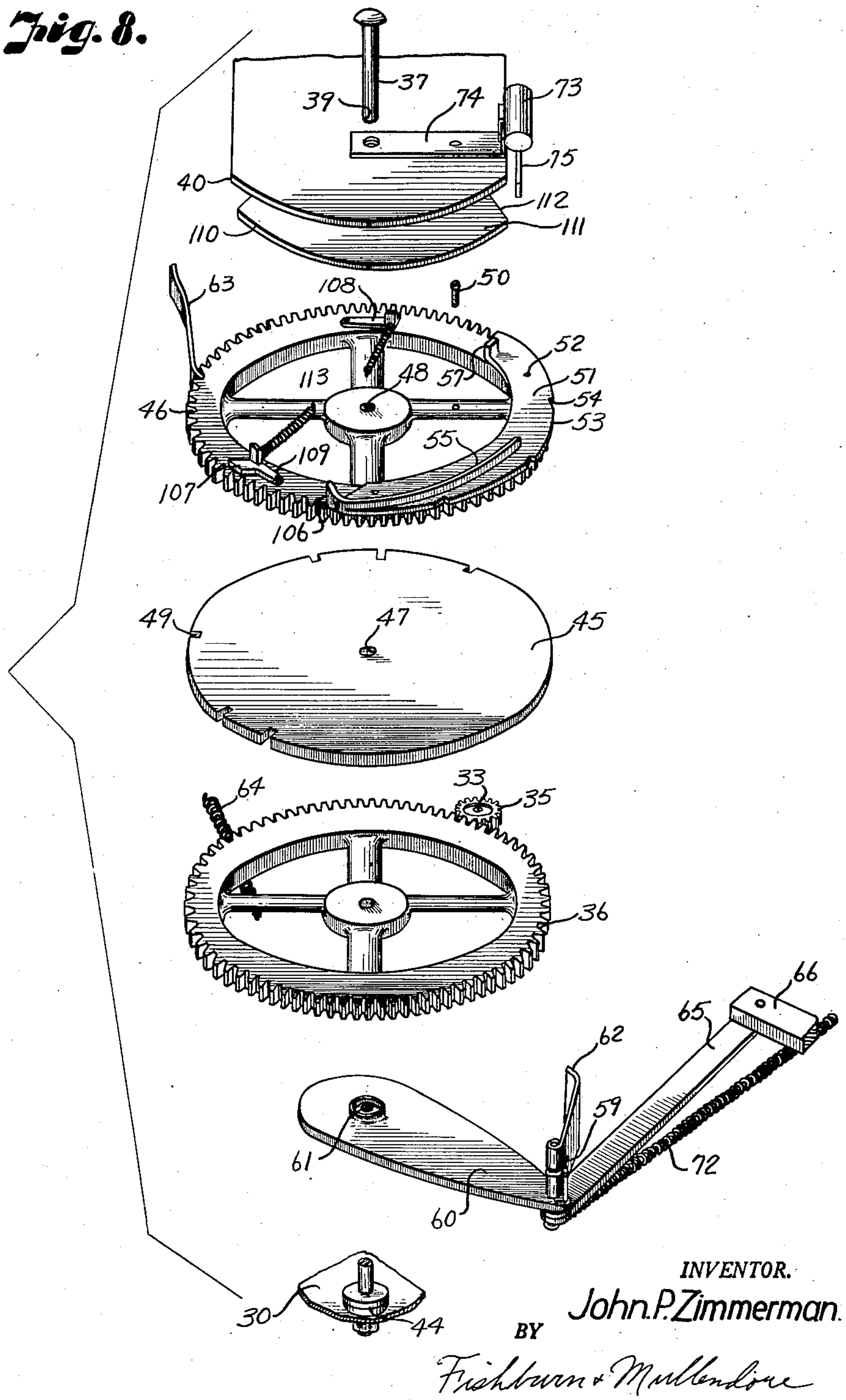
Fig. 8 is a disassembled perspective view of the number dialing mechanism.

The gear 36 has a stop 58 engageable with the shaft 33 or other suitable stop for limiting rotation of the gear 36 in a clockwise direction, Fig. 3. The gear 36, disk 45 and gear 46 are rotated in an anticlockwise direction by means of a detent 59 carried on an arm 60 which has a bearing aperture 61 sleeved on the shaft 37 whereby the arm 60 extends radially from said shaft and is rotatable thereon. The detent has a blade 62 of such width that it engages in the teeth of the gear 36, notches 49 of the disk 45, teeth of the gear 46 and notches 54 in the cam segment 51. The detent 59 is arranged whereby the blade 62 is resiliently urged into driving engagement with said teeth and notches during anticlockwise movement of the arm 60, Fig. 3, and is disengaged from the teeth and notches during anticlockwise movement of said arm 60. A resilient pawl or stop 63 has one end mounted on the block 42 and the other end resiliently engages the teeth of the gear 46 to prevent clockwise movement of said gear. The gear 36 is free on the shaft 37 and a spring 64 has one end connected to said gear 36 and the other end connected to the block 42 in such a manner as to urge the gear 36 in clockwise rotation whereby when the blade 62 is disengaged from the teeth of the gear 36 the spring 64 rotates said gear until the stop 58 engages the shaft 33.

The arm 60 is oscillated by means of a link 65 having one end pivotally connected to the end of the arm 60 and the other end pivotally connected to a crank arm 66. The crank arm 66 is fixed on and extends from a shaft 67 which is rotated by means of a gear train 68 driven by an electric motor 69, the gear train and motor being supported on spaced plates 70 and 71 which are held apart in the housing by means of spacers. The length of the crank arm 66 and diameter of the gears 35 and 36 are so proportioned that one rotation of the crank 66 moves the arm 60 sufficiently to rotate the gear 35 and dial crank 31 through an arc corersponding to that required for dialing the number zero on the telephone dial. A spring 72 has one end connected to a fixed portion of the frame 41 and the other end connected to the connection between the arm 60 and link 65 whereby said spring 72 aids the motor in operating the arm 60 to rotate the gears and dial the telephone and helps to balance the load on the motor 69. A mercury switch 73 is pivotally mounted on a bracket 74 fixed on the upper surface of the plate 40. The mercury switch is in circuit with the motor 69 and said switch has a depending finger 75 extending into the path of the lug 57.

When the mechanism is in condition to start giving an alarm and reporting an emergency the mercury switch is in a position to complete a circuit from the conductor 10 to a conductor 76 leading to the motor 69. The other terminal of the motor 69 is connected by a conductor 77 to the conductor 7. Conductors 78 and 79 connect the electrical circuits of the record player 24 to the conductors 10 and 7 respectively whereby the record player is in parallel circuit with the alarm device 16 and is also in parallel circuit with the mercury switch 73 and motor 69. With this arrangement, closing of the circuit by actuation of one of the thermostats 2 causes the record player to start operation and also energizes the motor 69 to drive the mechanism, rotating the gear 46 as the telephone is dialed. This operation continues until the gear 46 has made a complete revolution and the lug 57 strikes the finger 75 to tilt the mercury switch 73 breaking the circuit to the motor 69.

The mercury switch 73 may be reset manually by means of a rod 80 having one end pivotally connected to the finger 75 and the other end extending through an aperture of a lever 81. The end of the rod 80 extending through an aperture of the lever has a downturned portion forming a shoulder 82 whereby selective movement of the lever 81 tilts the mercury switch 73 to again complete the circuit to the motor 69. The lever 81 is arranged in the rear portion of the upper cabinet portion 29 and extends upwardly from a bar 83 arranged transversely of the cabinet and pivotally mounted for swinging movement of the lever 81 in a vertical plane parallel to the plane of swinging of the mercury switch 73.

A bracket 84 is fixed on the rear wall of the cabinet in spaced relation to the lever 81 and an arm 85 is pivotally mounted on said bracket and has a free end engageable with a forward face of a lateral flange 86 of the lever 81. A rod 87 is connected to the arm 85 and extends through the rear wall, the rear end of said rod having a knob 88 thereon whereby pulling on the knob 88 swings the arm 85 to rock the lever 81 toward the rear wall. A spring 89 is sleeved on the rod 87 with one end engaging the arm 85 and the other end engaging the rear wall so as to urge the free end of the arm 85 toward the front of the cabinet, with the engagement of the knob 88 with the rear wall of the cabinet forming a limit to the forward swinging movement of the arm 85.

Figure 2:
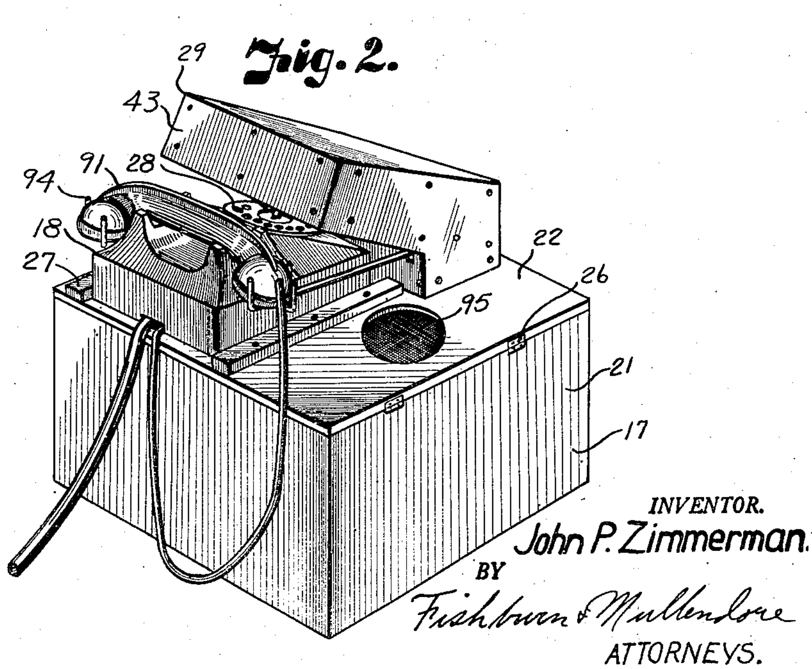
Fig. 2 is a perspective view of a telephone and a telephone actuating and dialing mechanism.

A shaft 90 extends transversely of the cabinet portion 29, preferably parallel to and spaced forwardly of the bar 83. The shaft 90 is rotatably mounted in the cabinet for rotation about an axis parallel to the receiver 91 of the telephone instrument 18. Arms 92 are fixed to the shaft 90 and extend forwardly thereof through apertures 93 in the housing portion 29 on opposite sides of the telephone instrument, said arms 92 terminating in receiver-engaging fingers 94, whereby the fingers on one of the arms 92 engage the ear portion of the receiver and the fingers on the other arm 92 engage the transmitter or mouthpiece portion of the receiver. As illustrated in Fig. 2, the transmitter or mouthpiece portion of the receiver should be arranged on the telephone instrument whereby it extends from the instrument toward an opening 95 in the cover 22, a speaker of the record player 24 being arranged under said opening 95 whereby there is such proximity between the speaker and receiver of the telephone instrument that the recorded message on the record 25 is clearly picked up and transmitted by the telephone. The weight of the arms 92 and the telephone receiver 91 allows the receiver to remain on the telephone instrument in a position to break the telephone circuit.

In order to raise the receiver and make the telephone circuit prior to dialing of the telephone instrument, an arm 96 extends upwardly from the shaft 80 and has a roller 97 rotatably mounted therein in a position to be engaged by the cam flange 55, the contour of the flange being such that rotation of the gear 46 will cause the cam to swing the arm 96 to the rear sufficiently to rotate the shaft 90 and raise the arms 93 to lift the telephone receiver 91 from the saddle of the instrument, whereby said telephone receiver is fully supported by the fingers 94 on the arms 92. During such swinging movement, a finger 98, which has a rear edge engaging the forward face of the lever 81, moves downwardly on said face into engagement with a notch 99. A spring 100, having one end connected to the shaft 90 and the other end connected to the lever 81, moves the lever 81 forwardly whereby the notch 99 engages over the finger 98 to hold the shaft 90 in telephone receiver raising position until the lever 81 is tripped manually by movement of the knob 88, rod 87, and arm 85, or by operation of the repeat mechanism of the record player.

While in many instances the reporting system would operate satisfactorily with one dialing of the telephone and one playing of the record 25, particularly where the fire station or other station receiving the report has a plurality of telephone trunklines, however, to provide for instances of fewer trunklines where the first dialing of the telephone might receive a busy signal, it is desirable that when the record 25 is completed the record player operate to repeat the playing of the record. It is also desirable that the telephone be redialed in such instances. Therefore, the repeat mechanism, which moves the tone arm 101 of the record player back to the starting position is connected by linkage 102 to a rod 103 that extends upwardly through an aperture 104 in the cover 22, the linkage being such that swinging of the tone arm 101 to the starting position moves the rod 103 upwardly through the aperture 104 into engagement with a lug 105 on the bar 83, swinging the bar 83 and lever 81 thereon toward the rear of the cabinet, disengaging the finger 98 from the shoulder 99, whereby the weight of the receiver swings the arms 92 downwardly allowing the receiver to return to the saddle of the telephone instrument, breaking the telephone circuit, and also the swinging movement of the lever 81 pulls the rod 80 to swing the mercury switch 73 into circuit-making position, again energizing the motor 69 to repeat the dialing operation.

Operation of the motor 69 drives the gear train 68, rotating the crank 66 whereby each rotation of said crank moves the arm 60 and a detent 59 thereon. The edge of the cam plate 51 extends beyond the teeth of the gears 36 and 46 whereby in the initial swinging movements of the arm 60 the blade 62 of the detent engages only the notches 54 of the cam plate 51, however, that operation moves the cam plate 51, gear 46 and disk 45 in an anticlockwise direction and those parts are held against clockwise direction by the stop 63. This movement causes the cam flange 55 to move the arm 96 and roller 97 to swing the shaft 90 and the arms 92 thereon to raise the telephone receiver from the saddle and complete the telephone circuit. This swinging movement also moves the finger 98 into engagement with the notch 99 to hold the receiver in raised position. When the raising of the receiver is completed the motor 69 continues to operate and drive the mechanism to continue to swing the arm 60 and advance the cam plate 51, gear 46 and disk 45 until the end 106 of the cam plate passes beyond the blade 62 of the detent. Then said blade engages the periphery of the disk 45, however, the notches 49 of the disk 45 are arranged whereby the next swinging movement of the arm 60 will engage the detent blade 62 in the first notch 49 of the disk 45 and also will cause the blade to engage in registering teeth of the gears 36 and 46 and the next advancing swinging of the arm 60 will then rotate the gear 36 and pinion 35 to swing the crank arm 38 to dial the first number of the telephone at the station to which the emergency is to be reported. The spacing of the notches 49 on the disk 45 is such that a corresponding rotation of the gear 36 will rotate the pinion 35 and swing the crank arm 31 only the amount corresponding to the extent of rotation of the dial 28 to dial the next digit of the telephone number. The stop 63 will prevent return or clockwise movement of the gear 46 and disk 45, however, during the return movement of the arm 60 the spring 64 urges the gear 36 in clockwise movement to rotate the pinion 35 to return the dialing crank 31 to its initial or starting position for the dialing of the next digit. If the next digit of the telephone number to be dialed is low as, for example, A, B, C or 2 only approximately one-third of the swing of the arm 60 can be used in dialing the next digit, however, two or three small numbers in order would cause all of those notches 49 to be within the swinging movement of the arm 60 and the detent blade 62. Therefore, it is necessary to hold the detent out of engagement of any notch until it arrives at the notch position for the correct amount of rotation for the dialing of the next digit. To hold the detent blade out of the other notches 49, lugs 107 are movably mounted on the gear 46 in alignment with said other notches 49 to cover and uncover said notches at selected points during the rotation of the gear 46 and disk 45. In the particular structure illustrated, the lugs 107 are mounted on arms 108 that are pivotally mounted as at 109 on the gear 46. The lugs 107 have portions engageable with the periphery 110 of a cam member 111 that is secured to the plate 40. The cam member 111 is so positioned as to move the lugs in notch-covering position and said cam member terminates as at 112 in a position to allow the lugs 107 to move out of covering relation to the next notch for receiving the detent blade 62. Springs 113 are arranged on the gear 46 and connected to the respective lugs 107 to draw said lugs toward the cam and also retract the lugs from notch-covering relation at the terminus 112 of the cam member.

With this arrangement, when two notches 49 are arranged with a spacing less than the full swinging movement of the arm 60 lugs 107 will cover all except the next notch in line and will hold the detent blade 62 out of engagement with said covered notches so that said blade will engage the next notch in order and move the disk 45 and gears 36 and 46 only the amount of the spacing between the notches and thereby swing the crank arm 31 only the amount necessary to dial the next digit in the telephone number of the station receiving the report of the emergency. Obviously different arrangements of the notches 49 and lugs 107 can be provided whereby different telephone numbers can be dialed. As the gear 46 and disk 45 complete the revolution, the lug 57 will engage the finger 75 to move the mercury switch to break the circuit to the motor 69 to stop further dialing movement, however, this stopping of the dialing movement is after the number has dialed and the receiver is still retained in lifted position. The call to the station having the dialed telephone number is completed and in the meantime the record player is playing the record 25 whereby the message on said record is made an audible signal by the speaker of the record player and is transmitted by the telephone to the station dialed. This dialing and playing of the record is preferably continued until the mechanism is stopped as by breaking the circuit by a master switch 114.

An alarm and emergency reporting system constructed and arranged as described in a circuit such as illustrated in Fig. 1 has a supply of current to operate the system upon closing of the circuit by means of one of the emergency detectors 2. When the circuit is closed current flows through the transformer 3, conductor 6, emergency detector 2, conductor 10, mercury switch 73, conductor 76, motor 69, conductor 77 and conductor 7 to energize said motor 69 to drive the mechanism for dialing the telephone and current also flows through the conductor 78, record player 24, conductor 79 to operate said record player to play the record 25. Current also flows through the audible alarm 16 to give an alarm at the premises. The apparatus will automatically dial the number as determined by the notches 49 in the disk 45 and complete a telephone call to the station having said number and upon that station answering the call the person answering same will hear the message that is recorded on the record 25. For example, in operating as a fire alarm, the call would be placed to the central control station of the fire department and the record would preferably advise that there is a fire, giving the address and other details as to location of the fire. Also the record could advise as to the type of building and its contents.

With this arrangement the telephone instrument could be removed at any time from the emergency reporting system and used in a conventional manner, for example, the time that the premises are occupied, and then the instrument could be placed on the cabinet as described when the premises would not be occupied or the occupants would be asleep or otherwise disposed wherein they might not become aware of the fire condition. With this arrangement the telephone service to the premises could be conventional. There would be no necessity of leased lines or other maintenance expense in the operation of the system. There would be no interference with the incoming calls or other conventional use of the telephone, yet the system would always be ready to operate to automatically report a fire or other emergency at any time the telephone instrument was located in the proper position on the cabinet.

It is believed obvious I have provided an emergency alarm and reporting system that is economical to manufacture, efficient in operation and usable in connection with conventional telephone service without the necessity of leased lines or other expensive service.

What I claim and desire to secure by Letters Patent is:

1. In the emergency alarm and reporting system for a building and the like, having an area to be protected, an emergency detector in said area, an electric circuit including the emergency detector and a source of electric current, a telephone instrument having a switch element responsive to raising and lowering the telephone receiver for controlling a service connection of the instrument with an automatic exchange station and a dial mechanism including a dial member with finger holes therein for partial rotation thereof for providing a number series to automatically connect the telephone instrument to a particular station having a signal corresponding to the number series dialed, and an electrically-operated message reproducer in circuit with the emergency detector for operation when the emergency detector closes the circuit to reproduce the message for transmission over the telephone system to the station dialed; a base member having a portion removably supporting the telephone instrument thereon, a frame on the base member and having a portion extending over the dial of the telephone instrument and terminating in spaced relation to the telephone receiver whereby the receiver may be lifted manually for answering incoming calls, an electric motor supported on the frame and in circuit with the emergency detector and energizable when the emergency detector closes the circuit, a rotatable member rotatably mounted on the frame, means operatively connecting the electric motor and rotatable member for rotating said member, means pivotally mounted on the frame and extending under the telephone receiver for lifting same to effect making of the telephone circuit to the service connection, means on the rotatable member operable during the initial rotation of the rotatable member for operating the telephone receiver lifting means, a rotary oscillatory member carried by the frame with the axis of oscillation thereof coaxial with the telephone dial, a finger on the oscillatory member and extending into a finger opening of the telephone dial for oscillating said dial in accordance with the oscillation of the oscillatory member, means engageable with the rotatable member and having operating connection with the oscillatory member for effecting oscillation of said dial in response to operation of the rotatable member whereby the dial oscillatory member moves the dial and dials a preselected number series on the telephone, and means stopping the operation of the electric motor and thereby stopping operation of the dialing of the telephone after the number has been dialed.

2. In an emergency alarm and reporting system for a building and the like, having an area to be protected, an emergency detector in said area, an electric circuit including the emergency detector and a source of electric current, a telephone instrument having a switch element responsive to raising and lowering the telephone receiver for controlling a service connection of the instrument with an automatic exchange station and a dial mechanism including a dial member with finger holes therein for partial rotation thereof for providing a number series to automatically connect the telephone instrument to a particular station having a signal corresponding to the number series dialed, and an electrically-operated message reproducer in circuit with the emergency detector for operation when the emergency detector closes the circuit to reproduce the message for transmission over the telephone system to the station dialed; a base member, means on the base member for removably locating the telephone instrument thereon, a frame on the base member and having a portion extending over the dial of the telephone instrument in spaced relation thereto and terminating in spaced relation to the telephone receiver whereby the receiver may be lifted manually for answering incoming calls, an electric motor supported on the frame and in circuit with the emergency detector and energizable when the emergency detector closes the circuit, a ratchet mechanism, means operable by the electric motor for reciprocating said ratchet mechanism, a rotatable member rotatably mounted on the frame and having a plurality of notches spaced around the periphery thereof and engageable by the ratchet mechanism, means pivotally mounted on the frame and engaging the telephone receiver for lifting same to effect making of the telephone circuit to the service connection, means on the rotatable member operable during the initial rotation of the rotatable member for operating the telephone receiver lifting means, means mounted on the frame for oscillation about an axis coaxial with the telephone dial, a finger on the oscillatory means and extending into a finger opening of the telephone dial for oscillating said dial, in accordance with the oscillation of the oscillatory means, means engageable with the ratchet mechanism and having operating connection with the oscillatory means for effecting oscillation of said dial in response to reciprocation of the ratchet mechanism, said rotatable member having a plurality of spaced notches therein engageable by said ratchet mechanism after the telephone receiver is lifted for rotating said rotatable member in accordance with the spacing of the notches, means on the rotatable member for limiting the rotation thereof and the engagement of the ratchet mechanism with the dial oscillatory means whereby the dial oscillatory means moves the dial in proportion to the spacing of the notches and thereby dials a pre-selected number series on the telephone, and means stopping the operation of the electric motor and thereby stopping operation of the dialing of the telephone after the number has been dialed.

3. In an emergency alarm and reporting system for a building and the like, having an area to be protected, an emergency detector in said area, an electric circuit including the emergency detector and a source of electric current, a telephone instrument having a switch element responsive to raising and lowering the telephone receiver for controlling a service connection of the instrument with an automatic exchange station and a dial mechanism including a dial member with finger holes therein for partial rotation thereof for providing a number series to automatically connect the telephone instrument to a particular station having a signal corresponding to the number series dialed, and an electrically-operated message reproducer in circuit with the emergency detector for operation when the emergency detector closes the circuit to reproduce the message for transmission over the telephone system to the station dialed; a base member having a portion removably supporting the telephone instrument thereon, a frame on the base member and having a portion extending over the dial of the telephone instrument in spaced relation thereto and terminating in spaced relation to the telephone receiver whereby said receiver may be lifted manually for answering incoming calls, an electric motor supported on the frame and in circuit with the emergency detector and energizable when the emergency detector closes the circuit, a ratchet mechanism, means operable by the electric motor for reciprocating said ratchet mechanism, a rotatable member rotatably mounted on the frame and having a plurality of notches spaced around the periphery thereof and engageable by the ratchet mechanism, means pivotally mounted on the frame and engaging the telephone receiver for lifting same to effect making of the telephone circuit to the service connection, means on the rotatable member operable during the initial rotation of the rotatable member for operating the telephone receiver lifting means, means engageable with the telephone receiver lifting means for retaining same in receiver lifted position, means mounted on the frame for oscillation about an axis coaxial with the telephone dial, a finger on the oscillatory means and extending into a finger opening of the telephone dial for oscillating same in accordance with the oscillation of the oscillatory means, means engageable with the ratchet mechanism and having operating connection with the oscillatory means for effecting oscillation of said dial in response to reciprocation of the ratchet mechanism, said rotatable member having a plurality of spaced notches therein engageable by said ratchet mechanism after the telephone receiver is lifted for rotating said rotatable member in accordance with the spacing of the notches, means on the rotatable member for limiting the rotation thereof and the engagement of the ratchet mechanism with the dial oscillatory means whereby the dial oscillatory means moves the dial in proportion to the spacing of the notches and thereby dials a pre-selected number series on the telephone, means stopping the operation of the electric motor and thereby stopping operation of the dialing of the telephone after the number has been dialed, and means associated with the message reproducing means for releasing the receiver lifting means and again completing the circuit to the electric motor for repeating the dialing of the telephone and the reproduction of the recorded message.

4. In an emergency alarm and reporting system for a building and the like, having an area to be protected, an emergency detector in said area, an electric circuit including the emergency detector and a source of electric current, a telephone instrument having a switch element responsive to raising and lowering the telephone receiver for controlling a service connection of the instrument with an automatic exchange station and a dial mechanism including a dial member with finger holes therein for partial rotation thereof for providing a number series to automatically connect the telephone instrument to a particular station having a signal corresponding to the number series dialed, and an electrically-operated message reproducer in circuit with the emergency detector for operation when the emergency detector closes the circuit to reproduce the message for transmission over the telephone system to the station dialed; a base member, means on the base member for removably locating the telephone instrument thereon, a frame on the base member and having a portion extending over the dial of the telephone instrument in spaced relation thereto and terminating in spaced relation to the telephone receiver whereby the receiver may be lifted manually for answering incoming calls, an electric motor supported on the frame and in circuit with the emergency detector and energizable when the emergency detector closes the circuit, a ratchet mechanism, means operable by the electric motor for reciprocating said ratchet mechanism, a rotatable member rotatably mounted on the frame and having a plurality of notches spaced around the periphery thereof and engageable by the ratchet mechanism, means engaging the rotatable member preventing rotation thereof in one direction whereby reciprocation of the ratchet mechanism effects rotation of said rotatable member in the other direction, means pivotally mounted on the frame and extending under the telephone receiver for lifting same to effect making of the telephone circuit to the service connection, cam means on the rotatable member operable during the initial rotation of the rotatable member for operating the telephone receiver lifting means, means engageable with the telephone receiver lifting means for retaining same in receiver lifted position, a rotary oscillatory member carried by the frame with the axis of oscillation thereof coaxial with the telephone dial, a finger on the oscillatory member and extending into a finger opening of the telephone dial for oscillating said dial in accordance with the oscillation of the oscillatory member, means engageable with the ratchet mechanism and having operating connection with the oscillatory member for effecting oscillation of said dial in response to reciprocation of the ratchet mechanism, means associated with said rotatable member for preventing operation of the oscillatory member during the initial rotation of the rotatable member which effects lifting of the telephone receiver, said rotatable member having a plurality of spaced notches therein engageable by said ratchet mechanism after the telephone receiver is lifted for rotating said rotatable member in accordance with the spacing of the notches, means on the rotatable member for limiting the rotation thereof and the engagement of the ratchet mechanism with the dial oscillatory member whereby the dial oscillatory member moves the dial in proportion to the spacing of the notches and thereby dials a pre-selected number series on the telephone, and means stopping the operation of the electric motor and thereby stopping operation of the dialing of the telephone after the number has been dialed.

5. In an emergency alarm and reporting system for a building and the like, having an area to be protected, an emergency detector in said area, an electric circuit including the emergency detector and a source of electric current, a telephone instrument having a switch element responsive to raising and lowering the telephone receiver for controlling a service connection of the instrument with an automatic exchange station and a dial mechanism including a dial member with finger holes therein for partial rotation thereof for providing a number series to automatically connect the telephone instrument to a particular station having a signal corresponding to the number series dialed, and an electrically-operated message reproducer in circuit with the emergency detector for operation when the emergency detector closes the circuit to reproduce the message for transmission over the telephone system to the station dialed; a base member, means on the base member for removably locating the telephone instrument thereon, a frame on the base member and having a portion extending over the dial of the telephone instrument in spaced relation thereto and terminating in spaced relation to the telephone receiver whereby the receiver may be lifted manually for answering incoming calls, an electric motor supported on the frame and in circuit with the emergency detector and energizable when the emergency detector closes the circuit, a ratchet mechanism, means operable by the electric motor for reciprocating said ratchet mechanism, a rotatable member rotatably mounted on the frame and having a plurality of notches spaced around the periphery thereof and engageable by the ratchet mechanism, means engaging the rotatable member preventing rotation thereof in one direction whereby reciprocation of the ratchet mechanism effects rotation of said rotatable member in the other direction, means pivotally mounted on the frame and extending under the telephone receiver for lifting same to effect making of the telephone circuit to the service connection, cam means on the rotatable member operable during the initial rotation of the rotatable member for operating the telephone receiver lifting means for retaining same in receiver lifted position, a rotary oscillatory member carried by the frame with the axis of oscillation thereof coaxial with the telephone dial, a finger on the oscillatory member and extending into a finger opening of the telephone dial for oscillating said dial in accordance with the oscillation of the oscillatory member, means engageable with the ratchet mechanism and having operating connection with the oscillatory member for effecting oscillation of said dial in response to reciprocation of the ratchet mechanism, means associated with said rotatable member for preventing operation of the oscillatory member during the initial rotation of the rotatable member which effects lifting of the telephone receiver, said rotatable member having a plurality of spaced notches therein engageable by said ratchet mechanism after the telephone receiver is lifted for rotating said rotatable member in accordance with the spacing of the notches, means on the rotatable member for limiting the rotation thereof and the engagement of the ratchet mechanism with the dial oscillatory member whereby the dial oscillatory member moves the dial in proportion to the spacing of the notches and thereby dials a pre-selected number series on the telephone, means stopping the operation of the electric motor and thereby stopping operation of the dialing of the telephone after the number has been dialed, and means associated with the message reproducing means for releasing the receiver lifting means and again completing the circuit to the electric motor for repeating the dialing of the telephone and the reproduction of the recorded message.

References Cited in the file of this patent

UNITED STATES PATENTS

| | | |
|---|---|---|
| 1,557,373 | Sindt | Oct. 13, 1925 |
| 2,036,420 | Lowry et al. | Apr. 7, 1936 |
| 2,099,913 | Tuscher et al. | Nov. 23, 1937 |
| 2,371,051 | Kendig | Mar. 6, 1945 |
| 2,518,174 | Picking et al. | Aug. 8, 1950 |
| 2,537,599 | Mountstephen | Jan. 9, 1951 |